Jan. 19, 1937.  G. F. FILLBRANDT  2,068,404
BASKET LINER
Filed June 13, 1934
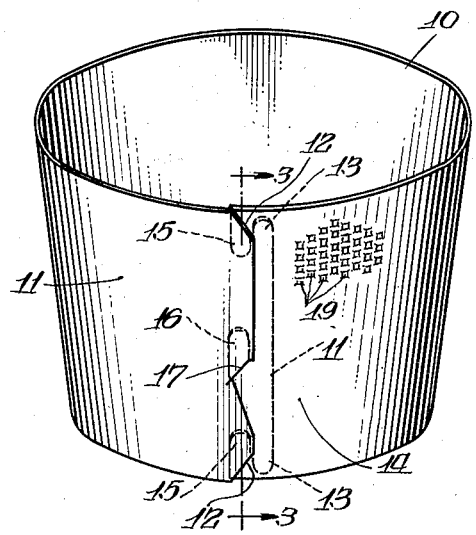
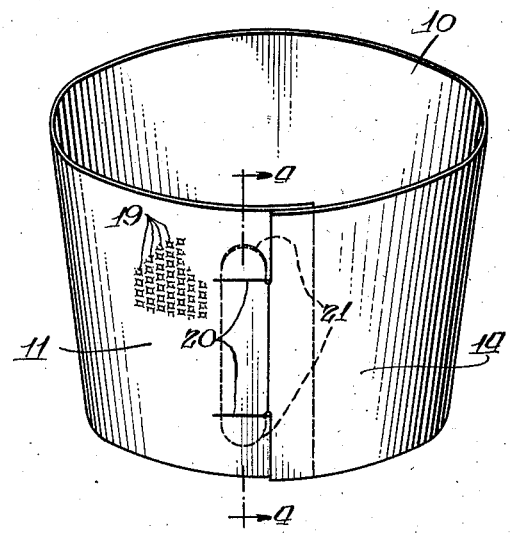
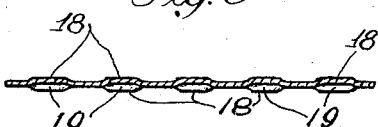
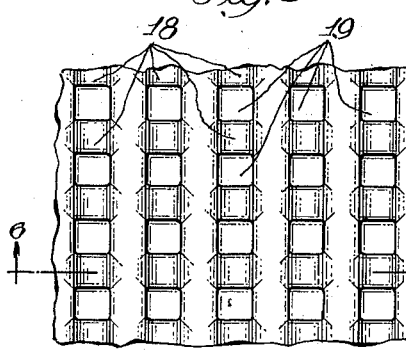
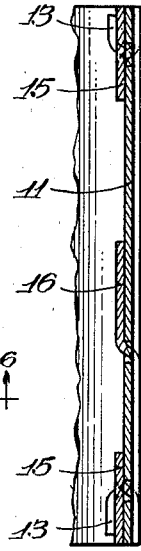
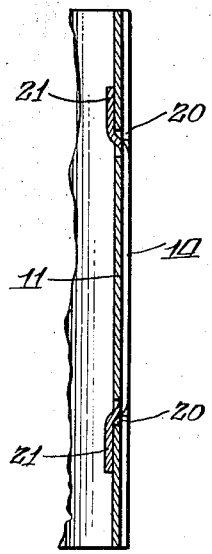
Inventor:
George F. Fillbrandt.
By: Eugene M. Giles
Attorney.

Patented Jan. 19, 1937

2,068,404

UNITED STATES PATENT OFFICE 2,068,404

BASKET LINER

George F. Fillbrandt, St. Joseph, Mich., assignor to Perfection Pack Company, Inc., St. Joseph, Mich., a corporation of Michigan Application June 13, 1934, Serial No. 730,421

4 Claims. (Cl. 217—3)

My invention relates to improvements in basket liners of the type generally employed for lining fruit and vegetable baskets and the like, the principal object of the invention being the provision of an improved basket liner which is simple and convenient and affords greater protection than liners that have been used heretofore.

Another object of the invention is the provision of a basket liner having a substantial cushioning effect.

Another object of the invention is the provision of a basket liner that is capable of stretching circumferentially.

Another object of the invention is the provision of a basket liner with improved locking means which may be easily and quickly engaged for joining the ends thereof.

Another object of the invention is to utilize a material having surface deformations or irregularities that contribute to the security of the interlocking of the ends.

Other objects will appear hereinafter.

The invention consists in the combination and arrangement of parts hereinafter described and claimed.

The invention will be best understood by reference to the accompanying drawing forming a part hereof and in which, Fig. 1 is a perspective view of a side wall basket liner embodying the invention and in which the thickness of the material has been somewhat exaggerated for the sake of clearness, Fig. 2 a similar view of the liner showing a modified form of locking arrangement for connecting the ends of the sheet, Fig. 3 an enlarged section taken substantially on the line 3—3 of Fig. 1 in which the thickness of material has again been exaggerated for the sake of clearness, Fig. 4, a similar section taken on the line 4—4 of Fig. 2, Fig. 5 an enlarged detail elevation of a fragmentary section of the sheet of which the liners are made, and Fig. 6 a section taken substantially on the line 6—6 of Fig. 5.

The embodiment of the invention illustrated in Figs. 1, 3, 5 and 6 comprises a sheet 10 of paper or similar material cut as indicated so as to be capable of being bent into frusto-conical form to fit the interior of a fruit or vegetable basket in the usual way. One end 11 of the sheet 10 is provided at its corners with notches 12 forming oppositely disposed locking tongues 13 at each corner thereof. The other end 14 of the sheet 10 is provided with two corresponding overhanging oppositely disposed locking tongues 15 adapted and arranged, as shown in Fig. 1, to co-operate and interlock with the notches 12 and tongues 13 in the other end of the sheet. The end 14 of the sheet 10 is also provided at or near its central portion with an intermediate locking tongue 16 projecting in the same direction as the lower tongue 15, but in opposite direction to the upper tongue 15, and the end 11 of the paper blank has a diagonal slit 17 suitably arranged to receive the tongue 16. With this construction the ends of the liner may be easily and quickly connected by slipping the lower tongue 15 and the middle tongue 16 into the lower notch 12 and slit 17 respectively, after which the upper tongue 15 is engaged with the upper notch 12 to prevent separation of the parts.

For affording a substantial cushioning effect for the basket contents and to assist in maintaining the ends of the sheet in interlocked engagement, the sheet 10 throughout its area is formed with suitable offsets on one or both sides, as for example, with a multiplicity of closely adjoining bosses 18 at opposite sides formed by pressing the paper outwardly at these places so that there are corresponding recesses or depressions 19 at the opposite side of the paper. This not only gives to the liner a cushiony character which insures greater protection for the basket contents, but these projections and recesses where the parts are overlapped at the end connection serve by a sort of intermeshing of the elevations and depressions on the opposed faces to minimize the possibility of the interlocked parts slipping out of engagement and thus insure a more dependable end connection. Furthermore, when the basket is filled more or less stretching strain is imposed on the liner and the provision of the paper with the elevations 18 and depressions 19 or similar deformities gives sufficient stretching capability to absorb the stretching strains that may be imposed on the liner.

In the embodiment of the invention illustrated in Figs. 2 and 4 a somewhat simpler form of end lock is provided, the end 11 of the sheet 10 merely having two horizontal slits 20 and the end 14 having two oppositely extending tongues 21 arranged to engage said slits 20 as shown in Figs. 2 and 4.

While I have illustrated and described the preferred form of construction for carrying the invention into effect, these are capable of variation and modification without departing from the spirit of the invention and I therefore, do not wish to be limited to the precise details of construction set forth, but desire to avail myself of such variations and modifications as fall within the scope of the appended claims.

I claim as my invention:

1. A basket liner comprising a frusto-conical shell formed of a sheet of relatively stiff flexible material having its surface provided with a multiplicity of projections and recesses adapted to intermesh at overlapping portions; and interlocking tongues and slits at the ends of said sheet.

2. A basket liner comprising a frusto-conical shell formed of a sheet of relatively stiff flexible material having interlocking tongues and slits at the ends, said tongues having projections and recesses on the faces thereof which intermesh with projections and recesses in the slitted end of the liner and serve to prevent withdrawal of said tongues from the slits.

3. A basket liner comprising a sheet of flexible material having a plurality of alternating bosses and depressions thereby forming alternating contact projections on opposite sides thereof; two oppositely disposed locking tongues extending inwardly at opposite corners of one end of said sheet, there being corresponding notches in the other end of the sheet forming outwardly extending tongues adapted and arranged to interlock with said first mentioned tongues; and an intermediate tongue projecting from the central portion of said first mentioned end of said sheet, substantially in the same direction as one of said first mentioned tongues and in a direction opposite to the other, there being a corresponding slit in the other end of the sheet to receive said intermediate tongue.

4. A basket liner comprising a sheet of flexible material; two oppositely disposed locking tongues extending inwardly at opposite corners of one end of said sheet, there being corresponding notches in the other end of the sheet forming outwardly extending tongues adapted and arranged to interlock with said first mentioned tongues; and an intermediate tongue projecting from the central portion of said first mentioned end of said sheet, substantially in the same direction as one of said first mentioned tongues and in a direction opposite to the other, there being a corresponding slit in the other end of the sheet to receive said intermediate tongue.

GEORGE F. FILLBRANDT.